United States Patent
Honjo

(10) Patent No.: US 7,071,241 B2
(45) Date of Patent: Jul. 4, 2006

(54) PROCESS FOR PRODUCING POROUS OBJECT

(75) Inventor: Akira Honjo, Osaka (JP)

(73) Assignee: Matsumoto Yushi-Seiyaku Co., Ltd., Osaka (JP)

( * ) Notice: Subject to any disclaimer, the term of this patent is extended or adjusted under 35 U.S.C. 154(b) by 353 days.

(21) Appl. No.: 10/220,017

(22) PCT Filed: Feb. 8, 2001

(86) PCT No.: PCT/JP01/00888

§ 371 (c)(1),
(2), (4) Date: Aug. 26, 2002

(87) PCT Pub. No.: WO01/64998

PCT Pub. Date: Sep. 7, 2001

(65) Prior Publication Data

US 2003/0104194 A1 Jun. 5, 2003

(30) Foreign Application Priority Data

Feb. 28, 2000 (JP) .............................. 2000-102841

(51) Int. Cl.
*C08J 9/28* (2006.01)
(52) U.S. Cl. .......................... 521/64; 264/51; 521/122; 521/155
(58) Field of Classification Search ................. 264/51, 264/53, 54, 45.3; 521/86, 122, 64, 155
See application file for complete search history.

(56) References Cited

U.S. PATENT DOCUMENTS

| | | | |
|---|---|---|---|
| 4,142,030 A * | 2/1979 | Dieterich et al. | 521/100 |
| 5,039,711 A * | 8/1991 | Blount | 521/105 |
| 5,668,187 A * | 9/1997 | Asako et al. | 521/137 |
| 6,147,134 A * | 11/2000 | Eling | 521/174 |

FOREIGN PATENT DOCUMENTS

JP 2000-297211 A 10/2000

* cited by examiner

*Primary Examiner*—Allan R. Kuhns
(74) *Attorney, Agent, or Firm*—Foley & Lardner LLP

(57) ABSTRACT

The present invention provides a process for producing porous structure having similar properties to that of the porous structure produced with conventional urethane resin solution in organic solvent and suitable for artificial leather, wherein the environmental pollution in the production process with a urethane resin solution in organic solvent and adverse effect on human health caused from remained organic solvent are solved and the problems caused from nonuniform pores produced with urethane resin emulsion are solved.

The present invention also provides a production process for porous structure wherein an aqueous urethane resin emulsion to which a highly crystalline substance comprising of a diisocyanate and low-molecular-weight diol is added, or an aqueous emulsion of urethane resin containing the said highly crystalline substance in its polymer chain is heated and gelled with steam with the presence of a pore-forming agent for stabilizing the gel of the said aqueous urethane resin emulsion in the heating and gelling process, and then the gelled aqueous urethane resin emulsion is heated and dried for forming the space of the water into porous structure. In addition, the present invention also provides a process for producing porous structure wherein an aqueous urethane resin emulsion is heated and gelled with steam with the presence of at least one of those selected from the group comprising silica, colloidal silica, silicic acid and silicate for stabilizing the gel of the said aqueous urethane resin emulsion in heating and gelling, and is heated and dried for forming the space of the water into porous structure.

13 Claims, 3 Drawing Sheets

PROCESS FOR PRODUCING POROUS OBJECT

FIELD OF INVENTION

This invention relates to a process for producing porous structure suitable for artificial leather wherein no organic solvents are employed.

TECHNICAL BACKGROUND

In the conventional technology, artificial leather has been produced in a wet process wherein a textile product is impregnated and coated with a polyurethane resin solution in an organic solvent such as dimethylformamide (DMF) containing various additives including pigments, and then the organic solvent is extracted with water to form porous structure; or in a dry process wherein porous structure is formed by utilizing the volatility of an organic solvent.

In those production processes, a lot of organic solvents used in the processes have been causing problems in work place and of environmental pollution. In addition, those organic solvents must have been removed completely from resultant artificial leather. Incomplete elimination of organic solvents gives adverse effects on workers in production processes and users or wearers of products. And a lot of energy, labor and expenses have been required for preventing water and air pollution and adverse effects on workers and wearers.

On the contrary, the solvent-free process with urethane resin emulsion require no recovering of organic solvents and improves working environment causing no water and air pollution. And the adverse effects on workers, users and wearers due to remained organic solvents in products can be remarkably minimized.

The conventional processes with urethane resin emulsion, in which pores are formed with foaming, can only produce porous structure consisting of separated air bubbles.

Such porous structure is not suitable for artificial leather. The porous structure that can only be produced with foaming has limited the end use and application field of the artificial leather produced with urethane resin emulsion.

A production process for fiber sheet containing uniform microporous structure of urethane resin and having soft handle, in which an aqueous resin composition consisting of urethane resin having carboxyl groups in its molecule, an inorganic salt, and a nonionic surfactant having a clouding point is employed for attaining the structure and handle, has been disclosed in Japanese Patent Laid Open Hei 11-335975. In the process, the microporous structure is produced through producing crystalline structure with water-insoluble nuclei formed with cross-linking a proper quantity of the said carboxyl groups contained in the urethane resin molecules and the polyvalent metal ions in the said inorganic salt, such as aluminum chloride or calcium chloride. And the quantity of the carboxyl groups contained the urethane resin molecules, in other words, the acid value of the solid portion of the urethane resin, influences on the microporous structure and the stability of the aqueous resin composition. A sufficient quantity of carboxyl groups in the urethane resin molecules for producing satisfactory microporous structure deteriorates the stability of the aqueous resin composition. Thus urethane resins containing limited quantity of carboxyl groups must be applied for the process.

The present invention provides a process for producing porous structure, consisting of continuous pores and suitable for artificial leather, with a specific aqueous emulsion of urethane resin for the purpose of eliminating the above-mentioned environmental pollution in the production process with a urethane resin solution in organic solvent and adverse effect on human health caused from remained organic solvent. In addition, the present invention provides porous structure that solves the problems caused from nonuniform pores produced with conventional aqueous urethane resin emulsion and has a property similar to the porous structure produced with conventional urethane resin solution in organic solvent.

DISCLOSURE OF INVENTION

The inventors of the present invention have concentrated on the study aiming to produce porous structure containing continuous pores with urethane resin emulsion, and finally found the procedure for attaining the object as mentioned below with which the present invention has been completed. The object can be attained with an aqueous urethane resin emulsion prepared by adding highly crystalline substance consisting of a diisocyanate such as diphenylmethane diisocyanate, dicyclohexylmethane diisocyanate, or isophorone diisocyanate and a low-molecular-weight diol such as ethylene glycol or tetramethylene glycol to an aqueous urethane resin emulsion, or with an aqueous urethane resin emulsion prepared by emulsifying a urethane resin produced through condensation polymerization of urethane resin utilizing the above-mentioned highly crystalline substance as nuclei. The said aqueous urethane resin emulsion is heated and gelled with steam in subsequent process to be formed into crystalline structure in which the said highly crystalline substance functions as the nuclei of the structure. Fine particles of silica, colloidal silica, silicic acid or silicate, especially those imparted with hydrophobic property, function effectively as a pore-forming agent to stabilize the gel of the said aqueous urethane resin emulsion through heating and gelling with steam. The gel is then heated and dried to remove water for forming the space of water droplets into continuous pores of porous structure suitable for artificial leather.

The present invention provides a production process for porous structure suitable for artificial leather through impregnating and coating nonwoven fabric, woven fabric or film with an aqueous urethane resin emulsion, then heating and gelling the impregnated fabric with steam, and finally heating to remove water from the fabric. In the process, an aqueous urethane resin emulsion to which the above-mentioned highly crystalline substance is added, or an aqueous emulsion of urethane resin containing the said highly crystalline substance in its polymer chain is blended with the above-mentioned pore-forming agent, heated and gelled with steam, and then heated to be dried in subsequent process. And through those processing steps, the urethane resin emulsion is gelled with the highly crystalline substance functioning as nuclei, in other words, converted from water soluble sol to water-insoluble gel, the urethane resin is then separated from water, and the space of the separated water is finally formed into continuous pores in heating and drying process to produce porous structure suitable for artificial leather.

The inventors of the present invention have completed the present invention also with the finding that an aqueous urethane resin emulsion, to which at least one of those selected from the group comprising silica, colloidal silica, silicic acid and silicate, especially those imparted with hydrophobic property, is added, can be formed into stable gel in which water and urethane resin are separated in steam-heating and gelling operation and then formed into porous structure suitable for artificial leather in the subsequent heating and drying wherein water is removed to leave its space as continuous pores.

The present invention provides a production process for porous structure suitable for artificial leather through impregnating and coating nonwoven fabric, woven fabric or film with aqueous urethane resin emulsion, heating to gel the emulsion with steam, and finally heating to dry the gel. In the process, at least one of those selected among the group comprising silica, colloidal silica, silicic acid and silicate, especially those imparted with hydrophobic property, is added to the said aqueous urethane resin emulsion, and the emulsion is heated to be gelled with steam and then heated to separate the resin and water and to remove the water to form the space of the water into continuous pores after the heating.

Further the present invention provides a process for producing porous structure suitable for artificial leather wherein polyalkylene glycols having affinity to water is added to the aqueous urethane resin emulsion as a stabilizer in addition to the said preferable pore-forming agent, such as silica, colloidal silica, silicic acid and/or silicate, more preferably silicic acid and/or silicate imparted with hydrophobic property, for the purpose of inhibiting water evaporation from the said aqueous urethane resin emulsion until the gel of the urethane resin emulsion is formed in the heating and gelling with steam and the urethane portion is completed in the heating and drying process so as to form the space of water into continuous pores certainly after the heating and drying process.

BEST MODE OF EMBODIMENT

Figure 1:
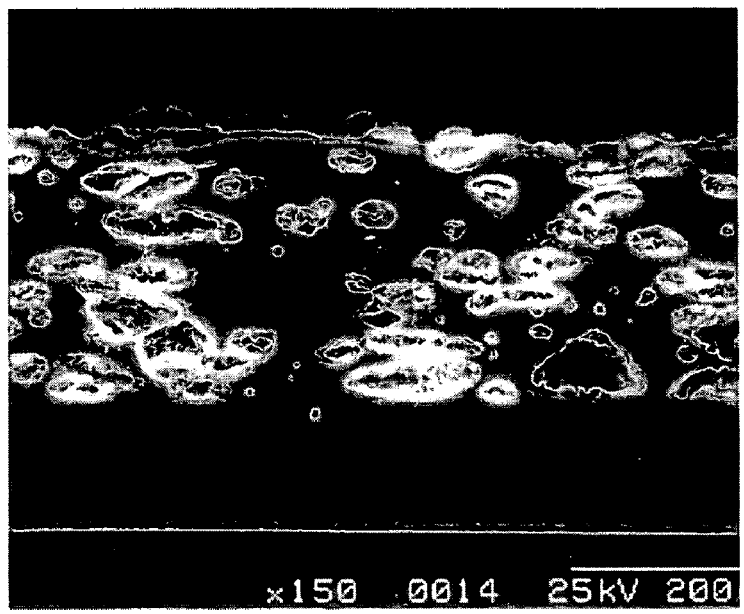
FIG. 1 shows the electron photomicrograph of porous structure in Example 3.

The best mode of the present invention is exemplified in the following description though the present invention is not restricted within the scope of the embodiment.

For attaining the above-mentioned object, the present invention provides a production process for porous structure wherein an aqueous urethane resin emulsion to which a highly crystalline substance comprising of a diisocyanate and low-molecular-weight diol is added, or an aqueous emulsion of urethane resin containing the said highly crystalline substance in its polymer chain is heated and gelled with steam being blended with a pore-forming agent that stabilizes the gel of the said aqueous urethane resin emulsion in the heating and gelling process and then the gelled aqueous urethane resin emulsion is heated and dried for leaving the space of the water into porous structure (First invention).

Further for attaining the said object, the present invention provides a process for producing porous structure wherein an aqueous urethane resin emulsion is heated and gelled with steam being blended with at least one of those selected from the group comprising silica, colloidal silica, silicic acid and silicate for stabilizing the gel and is heated and dried for forming the space of the water into porous structure (Second invention).

[First Invention]

At first, the aqueous urethane resin emulsion used for First invention is described.

In the production process of porous structure for artificial leather with an aqueous urethane resin emulsion, an aqueous urethane resin emulsion to which a highly crystalline substance comprising of diisocyanate, such as diphenylmethane diisocyanate (MDI), dicyclohexylmethane diisocyanate, or isophorone diisocyanate (IPDI), and of low-molecular-weight diol, such as ethylene glycol or tetramethylene glycol, preferably having superior compatibility to urethane resin, is added by 5 to 55 weight percent of the urethane resin, or an aqueous emulsion of urethane resin containing the said highly crystalline substance in its polymer chain by 5 to 55 weight percent is used. The preferable ratio of the urethane resin in the aqueous urethane resin emulsion is 10 to 35 weight percent.

In this specification, "a highly crystalline substance comprising of diisocyanate and low-molecular-weight diol" denotes a highly crystalline substance produced by reacting a highly crystalline diisocyanate and low-molecular-weight diol. And "an aqueous emulsion of urethane resin containing highly crystalline substance in its polymer chain" denotes an aqueous emulsion of urethane resin of which polymer chain (urethane resin chain) partially consists of the said highly crystalline substance.

The preferable diisocyanate is highly crystalline diphenylmethane diisocyanate (MDI), dicyclohexylmethane diisocyanate or isophorone diisocyanate (IPDI) and the preferable low-molecular-weight diol is ethylene glycol that is compatible to the said emulsion. The preferable molecular weight of the low-molecular-weight diol ranges from 62 to 200. Less than 5 weight percent of the highly crystalline substance to a urethane resin cannot attain the aimed effect while more than 55 weight percent of the said substance to a urethane resin is apt to deteriorate the property of the urethane resin due to the influence by the property of the said highly crystalline substance. Less than 5 weight percent of the highly crystalline substance in the polymer chain of a urethane resin cannot attain the aimed effect while more than 50 weight percent of the said substance is apt to deteriorate the property of a urethane resin due to the influence by the property of the said highly crystalline substance.

Preferable pore-forming agent added to the aqueous urethane resin emulsion of First invention is silica, colloidal silica, silicic acid or silicate, and the preferable ratio of the agent is 1 to 20 weight percent of a urethane resin. The preferable silicate is an alkaline metal salt.

Specifically preferable agent is a silicone compound that has superior performance for forming porous structure having continuous pores, such as silica, colloidal silica, silicic acid or silicate of which surface is imparted with hydrophobic property.

Such hydrophobic property imparted to silica, colloidal silica, silicic acid or silicate is attained with chemical reaction with an organic silicon compound, from which resultant compound is called as "reacted type". The organic silicon compound to be reacted with the said substances is substituted silanes, such as trimethylchlorosilane, dimethylchlorosilane or monomethylchlorosilane. Dimethylchlorosilane is most frequently used for economical reason.

In addition, hydrophobic property can also be imparted to, for example, silica by blending a suspension of silica and an organic silicon compound, adding organic solvent to the blend and separating the silica from the liquid phase, from which resultant substance is called as "absorbed type".

A pore-forming agent reacted with an organic silicon compound is more preferable than an "absorbed type" agent because the reacted type agent has superior pore-forming performance and the resultant pores have uniform size.

The hydrophobic property of those agents is determined by the minimum volume percent of methanol in an aqueous solution of methanol that can wet those agents (hereinafter referred to as M value). Preferable M value for sufficient pore-forming performance is 20 volume percent or more and the agents having M value of 45 volume percent or more are especially preferable.

Less than 1 weight percent of a pore-forming agent to urethane resin cannot attain the aimed effect while more than 20 weight percent of the agent deteriorates the property of urethane resin because the agent, silicic acid or silicate, is apt to crystallize in urethane resin.

[Second Invention]

The second invention of the present invention provides a production process of porous structure wherein an aqueous urethane resin emulsion is heated and gelled with steam with the presence of at least one of those selected from the group comprising silica, colloidal silica, silicic acid and silicate, which stabilizes the gel of the urethane resin emulsion in the heating and gelling step, as mentioned above, and then dried with heating to form the space of the water into pores.

In the above process, the preferable silica, colloidal silica, silicic acid and silicate are those imparted with hydrophobic property, especially those imparted with hydrophobic property through reaction with an organic silicon compound, because they have superior performance for forming porous structure having continuous pores. The examples of such silica, colloidal silica, silicic acid and silicate are the same as those exemplified in the above-mentioned [First invention].

The ratio of the urethane resin contained in the aqueous urethane resin emulsion employed in the second invention of the present invention preferably ranges from 10 to 35 weight percent.

The ratio of at least one of those selected from the group comprising silica, colloidal silica, silicic acid and silicate to urethane resin preferably ranges from 1 to 20 weight percent.

[Materials Common to First and Second Inventions]

The aqueous urethane resin emulsion employed both in the first and second inventions contains a stabilizer such as polyalkylene glycol having high affinity to water by 0.1 to 10 weight percent of urethane resin in the emulsion. The stabilizer functions together with silica, colloidal silica, silicic acid or silicate to control rapid water evaporation in heating and drying process to form more constant continuous pores.

Preferable stabilizer is a polyoxyethylene-polyoxypropylene block copolymer having a cloud point of 55° C. or higher in 1 weight percent aqueous solution, which does not lower its affinity to water during heating and drying process of which temperature range includes the cloud point of the stabilizer. Less than 0.1 weight percent of the stabilizer to urethane resin cannot attain the aimed effect and more than 10 weight percent results in poor quality of formed porous structure having continuous pores by imparting hydrophilic property to the surface of the porous structure.

Either anionic or nonionic urethane resins can be employed for preparing the aqueous urethane resin emulsion of the present invention according to the property of aimed artificial leather. And those anionic or nonionic urethane resins can also be employed for preparing the aqueous emulsion of a urethane resin containing a highly crystalline substance in its polymer chain.

[Process for Producing Porous Structure]

In the production process of the porous structure of the present invention, nonwoven fabrics, woven fabrics and knit fabrics employed in conventional processes can be employed as the base fabric for artificial leather. The impregnation and coating of an aqueous urethane resin emulsion can be practiced with similar machines used in conventional production facilities.

In First invention, the aqueous urethane resin emulsion blended with a highly crystalline substance can be prepared by adding a highly crystalline substance comprising of a diisocyanate and low-molecular-weight diol, then adding a pore-forming agent such as silicic acid imparted with hydrophobic property, preferably adding, for example, a polyoxyethylene-polyoxypropylene block copolymer, and homogenizing with a proper mixer.

The aqueous emulsion of a urethane resin containing a highly crystalline substance in its polymer chain can be prepared through the process wherein a highly crystalline substance is at first produced by condense-polymerizing the aforementioned diisocyanate such as diphenylmethane diisocyanate (MDI), dicyclohexylmethane diisocyanate or isophorone diisocyanate (IPDI), and low-molecular-weight diol, such as ethylene glycol or tetramethylene glycol, in an organic solvent compatible to polyurethane, such as dimethylformamide (DMF), ethylene glycol diethyl ether or ethylene glycol monoethyl ether acetate; then the produced highly crystalline substance is condense-polymerized with a polyol, such as polyoxyethylene-polyoxypropylene random copolymer, polyalkylene glycol (polytetraethylene glycols, etc.) or polyoxyethylene glycol copolymer, and with a diisocyanate other than the diisocyanate employed for producing the highly crystalline substance, with the presence of, if necessary, dipolyalkylene glycol ester of a dibasic acid to be formed into a urethane resin; water is added to the resultant urethane resin; and the organic solvent is removed with distillation to make up an emulsion. An aqueous emulsion of the urethane resin containing the highly crystalline substance in its polymer chain can preferably be made by adding a pore-forming agent, such as silica, colloidal silica, silicic acid or silicate imparted with hydrophobic property, and preferably polyoxyethylene-polyoxypropylene block copolymer to the above-mentioned aqueous emulsion of the said urethane resin containing the said highly crystalline substance in its polymer chain, and by homogenizing the mixture with a mixer. In addition, a proper surfactant can also be added to the aqueous emulsion of the urethane resin containing the highly crystalline substance in its polymer chain in the process of preparing the emulsion.

In Second invention, the aqueous urethane resin emulsion can be prepared by adding silica, colloidal silica, silicic acid or silicate being imparted with hydrophobic property, and preferably polyoxyethylene-polyoxypropylene block copolymer to an aqueous urethane resin emulsion, and by homogenizing with a mixer.

A proper quantity of a viscosity improver consisting of acrylic acids or surfactants can be added to the aqueous urethane resin emulsion of the first or second invention for the purpose of controlling emulsion viscosity suitable for impregnation and coating.

Heating and gelling with steam can be practiced with the parameters of a normal-pressure steamer, such as saturated steam at 60 to 100° C., and subsequent heating and drying operation can be practiced through dry-heating with a common tenter frame or drying with far-infrared radiation preferably at 70 to 120° C.

EXAMPLES

The present invention is further described with the following examples though the present invention is not restricted within the scope of those examples. The "part or parts" mentioned in the following examples are part or parts by weight unless otherwise specified.

The polyester nonwoven fabric used in the evaluation had a thickness of 1.3 mm and a density of 0.27 g/cm². The properties provided by the present invention were evaluated in the following procedure.

Figure 2:
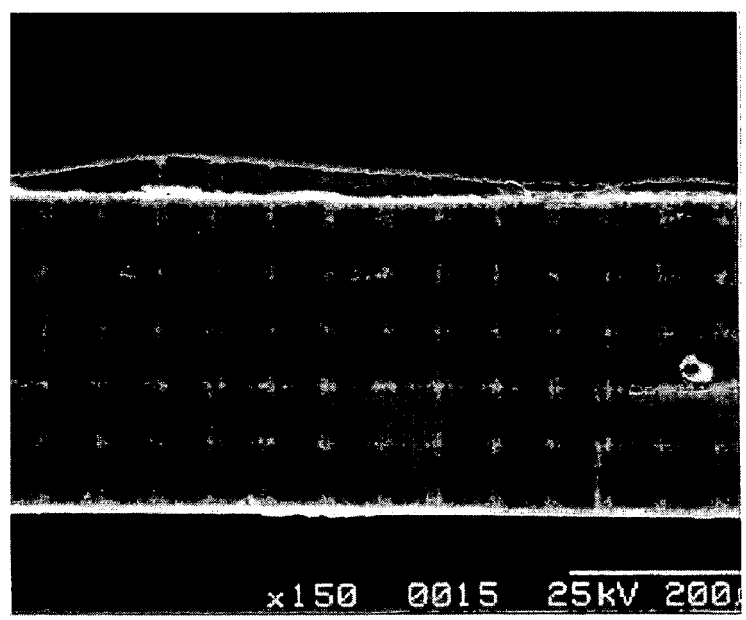
FIG. 2 shows the electron photomicrograph of porous structure in Comparative Example 1.
Figure 3:
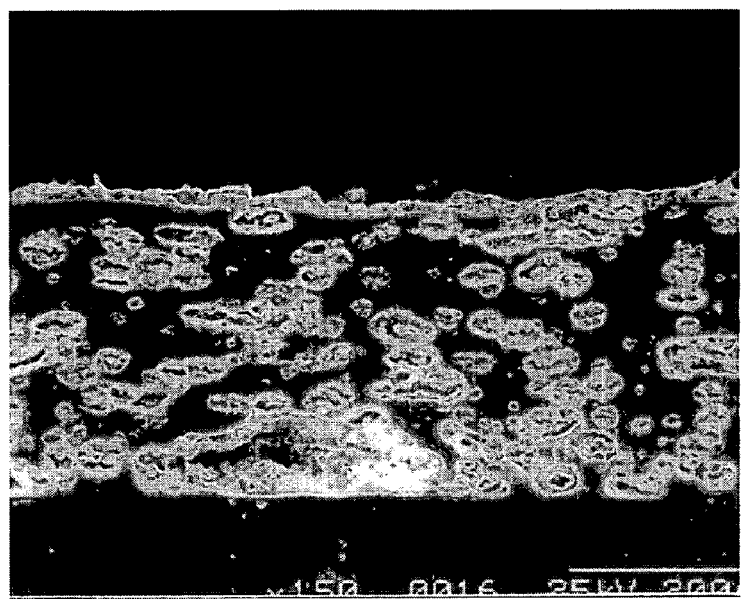
FIG. 3 shows the electron photomicrograph of porous structure in Example 6.
Figure 4:
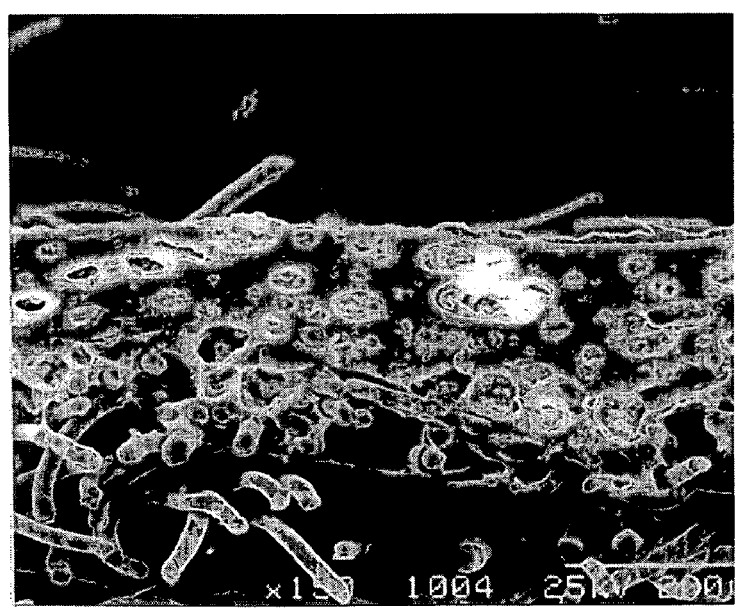
FIG. 4 shows the electron photomicrograph of porous structure in Example 11.
Figure 5:
FIG. 5 shows the electron photomicrograph of porous structure in Comparative Example 2.
Figure 6:
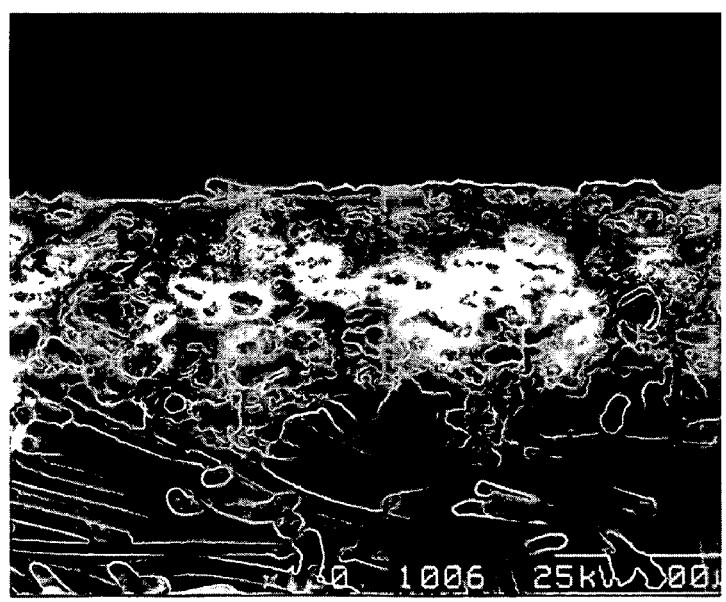
FIG. 6 shows the electron photomicrograph of porous structure in Example 14.

Electron photomicrograph: The porous structure at the surface of the artificial leathers produced in Examples and Comparative Examples was taken in scanning electron photomicrographs (SEM) and evaluated. The SEMs in FIGS. 1 to 6 show the surface of artificial leather magnified 150 times.

Visual inspection of porous structure: The porous structure admitted to be the most preferable for artificial leather was marked with "⊚", preferable with "○", least acceptable with "Δ", and not applicable with "X".

Thickness: measured with a PEACOCK Thickness Meter, Type H, produced by Ozaki Seisakusho Co., Ltd., with minimum graduation of 0.01 mm Density: evaluated in the procedure defined in JIS-K-6505

Hardness and softness: evaluated in the procedure defined in JIS-L-1079 (Smaller figure indicates softer handle.)

Example 1

Five hundred milliliter of dimethylformamide (DMF) and 300 ml of ethylene glycol diethyl ether were placed in a reactor equipped with a reflux condenser, an agitator, a thermometer and dropping devices, and diphenylmethane diisocyanate (375 g or 1.5 mol) was added under nitrogen gas flow. The mixture was homogenized with agitation at 40° C. or lower and dissolved in an organic solvent. Then ethylene glycol (62 g or 1.0 mol) was dropped from a dropping device into the mixture at 80° C. or lower to react with the diphenylmethane diisocyanate.

After the exothermal reaction was completed, the mixture was cooled down to 40° C. or lower and 200 ml of aqueous solution containing sodium bisulfite (83 g or 0.52 mol) and a surfactant of POE alkyl ether having a HLB of 12 or higher and proper emulsifying performance (10.4 g or 2 weight percent of resin) was dropped from a dropping device to cap non-reacted isocyanate groups. Then 800 ml of deionized water being conditioned at 50° C. or less was dropped in the mixture from a dropping device.

After the dropping, the mixture was homogenized with agitation and the organic solvent used was removed with reduced pressure distillation from the reacted product. Then the water evaporated in azeotrope during the reduced pressure distillation was compensated to make up the aqueous dispersion of the highly crystalline substance to be employed in the first invention of the present invention.

Example 2

Five hundred milliliter of dimethylformamide (DMF) and 300 ml of ethylene glycol diethyl ether were placed in a reactor having the same equipment as in Example 1, and diphenylmethane diisocyanate (276 g or 1.1 mol) was added under nitrogen gas flow. The mixture was homogenized with agitation at 40° C. or lower and dissolved in an organic solvent. Then ethylene glycol (62 g or 1.0 mol) was dropped from a dropping device into the mixture at 80° C. or lower to react with the diphenylmethane diisocyanate.

After the exothermal reaction was completed, the mixture was cooled down to 40° C. or lower and isophorone diisocyanate (244.5 g or 1.1 mol) as a diisocyanate compound other than diphenylmethane diisocyanate, polytetramethylene glycol having a molecular weight of 1000 (500 g or 0.5 mol), polyethylene glycol having a molecular weight of 600 (54 g or 0.09 mol), trimethylol propane (8 g or 0.06 mol) and tetramethylene glycol (11.8 g or 0.13 mol) were added. They were reacted with the mixture at 70 to 90° C. with 0.3 g of tin octylate as a catalyst to produce urethane prepolymer containing a highly crystalline substance that had isocyanate groups on its molecular chain terminal.

Then 1885 g of an aqueous solution containing diethylene glycol (10 g) and piperazine (10 g) as polymer-chain extenders and POE (18) styrenated phenol ether (40.2 g or 5 weight percent of resin) as an emulsifier was added to the prepolymer at 60° C. or lower for extending polymer chain and the mixture was preliminarily emulsified to make up a mixture of urethane resin, water and organic solvent. The mixture was further agitated with a homogenizer to be emulsified mechanically and forcedly and made into homogeneous emulsion.

Then the organic solvent in the above emulsion was removed with reduced pressure distillation and the water evaporated in azeotrope during the reduced pressure distillation was compensated to make up the aqueous emulsion of urethane resin containing highly crystalline substance in its polymer chain of the present invention.

Examples 3 to 10 and Comparative Example 1

For checking continuous pore structure formed in film, each of the compositions listed in Table 1 was coated on polyester film of 100-micrometer thickness with 1.0-mm clearance, heated and gelled with saturated steam at 90° C. for 30 minutes, and heated and dried with dry air at 95° C. for 60 minutes to be processed into film on which porous structure was layered.

TABLE 1

| | Tests on Film | | | | | | | | |
|---|---|---|---|---|---|---|---|---|---|
| Components (parts by weight) and evaluation of porous structure | Comparative Example 1 | Example 3 | Example 4 | Example 5 | Example 6 | Example 7 | Example 8 | Example 9 | Example 10 |
| SUPERFLEX E-2000 | 80 | 80 | 56 | | 80 | 56 | | 80 | 80 |
| Dispersion of highly crystalline substance with 40-% concentration in Example 1 | | | 30 | | | 30 | | | |
| Urethane resin emulsion having highly crystalline substance in polymer chain with 40-% concentration in Example 2 | | | | 100 | | | 100 | | |
| Colloidal silica | | 10 | 10 | 10 | | | | | |
| Hydrophobic silicic acid (reacted type) | | | | | 2 | 2 | 2 | | |

TABLE 1-continued

Tests on Film

| Components (parts by weight) and evaluation of porous structure | Comparative Example 1 | Example 3 | Example 4 | Example 5 | Example 6 | Example 7 | Example 8 | Example 9 | Example 10 |
|---|---|---|---|---|---|---|---|---|---|
| Hydrophobic silica (reacted type) | | | | | | | | 2 | |
| Hydrophobic silica (absorbed type) | | | | | | | | | 2 |
| Polyalkylene glycols | | 5 | 5 | 5 | 5 | 5 | 5 | 5 | 5 |
| SDK | 5 | 5 | 5 | 5 | 5 | 5 | 5 | 5 | 5 |
| Water | 120 | 120 | 114 | 100 | 120 | 114 | 100 | 100 | 100 |
| Porous state (Words in the parentheses indicate the number of figures showing SEM.) | Non-porous X (FIG. 2) | Porous Δ (FIG. 1) | Porous ○ | Porous ○ | Porous ◎ (FIG. 3) | Porous ◎ | Porous ◎ | Porous ◎ | Porous ○ |
| Thickness (mm) | 0.28 | 0.52 | 0.75 | 0.77 | 0.68 | 0.77 | 0.78 | 0.80 | 0.64 |
| Density (g/cm$^3$) | 0.779 | 0.659 | 0.472 | 0.472 | 0.474 | 0.468 | 0.462 | 0.465 | 0.470 |
| Hardness and softness (mg) | 77 | 56 | 59 | 54 | 63 | 52 | 53 | 52 | 53 |

The components in Table 1 and in Tables 2 to 4 described below are as follows.

SUPERFLEX E-2000: forcibly emulsified nonionic urethane resin emulsion produced by Dai-Ichi Kogkyo Seiyaku Co., Ltd., with 50-% concentration and a pH of 6 to 8, producing dried film of which 100-% modulus is 7 MPa Highly crystalline substance described in Example 1 of the present invention, containing 40% of highly crystalline substance Emulsion of urethane resin containing highly crystalline substance in its polymer chain described in Example 2 of the present invention, containing 40% of urethane resin Colloidal silica: produced by Nissan Kagaku Kogyo Co., Ltd., with the trade name of SNOWTEX with an M value of 0%

Hydrophobic silicic acid: produced by Matsumoto Yushi-Seiyaku Co., Ltd., with the trade name of Silicic Acid H with an M value of 45%

Hydrophobic silica (reacted): produced by Nippon Silica Kogyou Co., Ltd., with the trade name of Nipsil SS-178B, with an M value of 60%

Hydrophobic silica (absorbed): produced by Matsumoto Yushi-Seiyaku Co., Ltd., with the trade name of Silica SS with an M value of 40%

Polyalkylene glycols: nonionic polyalkylene glycol block copolymer produced by adding ethylene oxide to polypropylene glycol (2000 molecular weight) to a ratio with which ethylene oxide is contained 80 weight percent of the resultant glycol, of which 1-% solution has a cloud point of 100° C. or higher, with 100% concentration SDK: a nonionic viscosity improver produced by Matsumoto Yushi-Seiyaku Co., Ltd., with 100% concentration Examples 11 to 17 and Comparative Example 2

Polyester nonwoven fabric having a thickness of 1.3 mm and a density of 0.27 g/cm$^2$ was immersed in a solution prepared by adding 3 weight percent of methylhydrogen polysiloxane emulsion (produced by Matsumoto Yushi-Seiyaku Co., Ltd. with the trade name of GERANEX S-3) and 1 weight percent of a zinc compound emulsion, which was the catalyst of the said polysiloxane, (produced by Matsumoto Yushi-Seiyaku Co., Ltd. with the trade name of Catalyst TSC-450), squeezed with a mangle to remove excessive solution and dried at 120° C. to be made into pre-treated nonwoven fabric (silicone-treated nonwoven fabric).

After squeezing with a mangle, the quantity of the solution remained in the nonwoven fabric was 130 weight percent of the fabric, in other words, 130 g of the solution remained in 100 g of the nonwoven fabric.

Then the pre-treated nonwoven sample was coated with each of the compositions in Table 2 with 1.0-mm clearance, treated in heating and gelling with saturated steam at 90° C. for 30 minutes, and dried with dry heating at 95° C. for 120 minutes to be formed into a fabric like artificial leather.

TABLE 2

Tests on Silicone-Treated Nonwoven Fabric

| Components (parts by weight) and evaluation of porous structure | Comparative Example 2 | Example 11 | Example 12 | Example 13 | Example 14 | Example 15 | Example 16 | Example 17 |
|---|---|---|---|---|---|---|---|---|
| SUPERFLEX E-2000 | 80 | 80 | 56 | | 80 | 56 | | 80 |
| Dispersion of highly crystalline substance with 40-% concentration in Example 1 | | | 30 | | | 30 | | |
| Urethane resin emulsion having highly crystalline substance in polymer chain with 40-% concentration in Example 2 | | | | 100 | | | 100 | |
| Colloidal silica | | 10 | 10 | 10 | | | | |
| Hydrophobic silicic acid (reacted type) | | | | | 2 | 2 | 2 | |
| Hydrophobic silica (reacted type) | | | | | | | | 2 |
| Polyalkylene glycols | | 5 | 5 | 5 | 5 | 5 | 5 | 5 |
| SDK | 5 | 5 | 5 | 5 | 5 | 5 | 5 | 5 |

TABLE 2-continued

Tests on Silicone-Treated Nonwoven Fabric

| Components (parts by weight) and evaluation of porous structure | Comparative Example 2 | Example 11 | Example 12 | Example 13 | Example 14 | Example 15 | Example 16 | Example 17 |
|---|---|---|---|---|---|---|---|---|
| Water | 120 | 120 | 114 | 100 | 120 | 114 | 100 | 100 |
| Porous state (Words in the parentheses indicate the number of figures showing SEM.) | Non-porous X (FIG. 5) | Porous Δ (FIG. 4) | Porous ○ | Porous ○ | Porous ◎ (FIG. 6) | Porous ◎ | Porous ◎ | Porous ◎ |
| Thickness (mm) | 1.37 | 1.83 | 2.08 | 2.01 | 2.11 | 2.23 | 2.27 | 2.25 |
| Density (g/cm$^2$) | 0.435 | 0.396 | 0.388 | 0.379 | 0.378 | 0.376 | 0.376 | 0.374 |
| Hardness and softness (mg) | 490 | 510 | 520 | 510 | 510 | 510 | 520 | 510 |

Examples 18 to 20 and Comparative Example 3

Polyester nonwoven fabric having a thickness of 1.3 mm and a density of 0.27 g/cm$^2$ was immersed in a solution prepared by adding 3 weight percent of methylhydrogen polysiloxane emulsion (produced by Matsumoto Yushi-Seiyaku Co., Ltd. with the trade name of GERANEX S-3) and 1 weight percent of a zinc compound dispersion, which was the catalyst of the said polysiloxane, (produced by Matsumoto Yushi-Seiyaku Co., Ltd. with the trade name of Catalyst TSC-450), squeezed with a mangle to remove excessive solution and dried at 120° C. to be made into pre-treated nonwoven fabric.

After squeezing with a mangle, the quantity of the solution remained in the nonwoven fabric was 130 weight percent of the fabric weight, in other words, 130 g of the solution remained in 100 g of the nonwoven fabric.

Then the pre-treated nonwoven sample was impregnated with each of the compositions in Table 3, treated in heating and gelling with saturated steam at 90° C. for 30 minutes, and dried with dry heating at 95° C. for 120 minutes to be made into a test fabric containing urethane resin.

TABLE 3

Urethane Resin Impregnation in Nonwoven Fabric

| Components (parts by weight) | Comparative Example 3 | Example 18 | Example 19 | Example 20 |
|---|---|---|---|---|
| SUPERFLEX E-2000 | 80 | 80 | 56 | |
| Dispersion of highly crystalline substance with 40-% concentration in Example 1 | | | 30 | |
| Urethane resin emulsion having highly crystalline substance in polymer chain with 40-% concentration in Example 2 | | | | 100 |
| Colloidal silica | | 10 | 10 | 10 |
| Polyalkylene glycols | | 5 | 5 | 5 |
| SDK | 5 | 5 | 5 | 5 |
| Water | 170 | 170 | 164 | 150 |

Examples 21 to 27 and Comparative Example 4

The nonwoven fabric containing urethane resin described in the above Comparative Example 3 was coated with each of the compositions in Table 4 with 1.0-mm clearance, treated in heating and gelling with saturated steam at 90° C. for 30 minutes, and dried with dry heating at 95° C. for 120 minutes to be formed into a fabric like artificial leather.

TABLE 4

Tests on Urethane-Resin-Impregnated Nonwoven Fabric

| Components (parts by weight) and evaluation of porous structure Impregnate fabric tested | Comparative Example 4 Comparative Example 3 | Example 21 Example 18 | Example 22 Example 19 | Example 23 Example 20 | Example 24 Example 18 | Example 25 Example 19 | Example 26 Example 20 | Example 27 Example 18 |
|---|---|---|---|---|---|---|---|---|
| SUPERFLEX E-2000 | 80 | 80 | 56 | | 80 | 56 | | 80 |
| Dispersion of highly crystalline substance with 40-% concentration in Example 1 | | | 30 | | | 30 | | |
| Urethane resin emulsion having highly crystalline substance in polymer chain with 40-% concentration in Example 2 | | | | 100 | | | 100 | |
| Colloidal silica | | 10 | 10 | 10 | | | | |
| Hydrophobic silicic acid (reacted type) | | | | | 2 | 2 | 2 | |
| Hydrophobic silica (reacted type) | | | | | | | | 2 |
| Polyalkylene glycols | | 5 | 5 | 5 | 5 | 5 | 5 | 5 |
| SDK | 5 | 5 | 5 | 5 | 5 | 5 | 5 | 5 |
| Water | 120 | 120 | 114 | 100 | 120 | 114 | 100 | 100 |

TABLE 4-continued

Tests on Urethane-Resin-Impregnated Nonwoven Fabric

| Components (parts by weight) and evaluation of porous structure Impregnate fabric tested | Comparative Example 4 Comparative Example 3 | Example 21 Example 18 | Example 22 Example 19 | Example 23 Example 20 | Example 24 Example 18 | Example 25 Example 19 | Example 26 Example 20 | Example 27 Example 18 |
|---|---|---|---|---|---|---|---|---|
| Porous state | Non-porous X | Porous Δ | Porous ○ | Porous ○ | Porous ◎ | Porous ◎ | Porous ◎ | Porous ◎ |
| Thickness (mm) | 1.49 | 1.97 | 2.16 | 2.11 | 2.19 | 2.22 | 2.21 | 2.20 |
| Density (g/cm³) | 0.491 | 0.469 | 0.428 | 0.446 | 0.435 | 0.428 | 0.430 | 0.431 |
| Hardness and softness (mg) | 760 | 730 | 740 | 740 | 740 | 740 | 750 | 740 |

FIELD OF APPLICATION

The process of the present invention can solve the troubles found in the processes with urethane resin solution in organic solvent owing to the above-mentioned aqueous urethane resin emulsion employed in the said process. In addition, the process of the present invention can provide ideal porous structure for producing low-density bulky porous structure containing continuous foamy pores and suitable for artificial leather, which is lighter and softer than the porous structure produced in processes other than the present invention.

The invention claimed is:

1. A process for producing a porous structure, wherein an aqueous urethane resin emulsion, to which a highly crystalline substance comprising a diisocyanate and low-molecular-weight diol is added, or an aqueous emulsion of urethane resin containing the highly crystalline substance in its polymer chain is heated and gelled with steam with the presence of a pore-forming agent for stabilizing the gel of the said aqueous urethane resin emulsion in the heating and gelling, and heated and dried for forming the space of water into pores, wherein the aqueous urethane resin emulsion contains 61.5% to 89.99% by weight of water.

2. The process in claim 1 wherein the said pore-forming agent is at least one of silica, colloidal silica, silicic acid and silicate.

3. The process in claim 2 wherein the said silica, colloidal silica, silicic acid and silicate are hydrophobic.

4. A process for producing a porous material wherein an aqueous urethane resin emulsion containing 61.5% to 89.99% by weight of water is heated and gelled with steam with the presence of at least one of those selected from the group comprising silica, colloidal silica, silicic acid and silicate for stabilizing the gel of the said aqueous urethane resin emulsion in the heating and gelling with steam, and heated and dried for forming the space of water into pores.

5. The process in claim 4 wherein the said silica, colloidal silica, silicic acid and silicate are hydrophobic.

6. The process in claim 1, wherein a density of the porous structure is from 0.35 to 0.50 g/cm³.

7. The process in claim 4, wherein a density of the porous material is from 0.35 to 0.50 g/cm³.

8. The process in claim 1, wherein a pore-forming agent and a stabilizer are contained in the aqueous urethane resin emulsion.

9. The process in claim 8, wherein the stabilizer is a polyalkylene glycol having a cloud point of 55° C. or higher as an aqueous 1 wt. % solution thereof.

10. The process in claim 4, wherein a pore-forming agent and a stabilizer are contained in the aqueous urethane resin emulsion.

11. The process in claim 10, wherein the stabilizer is a polyalkylene glycol having a cloud point of 55° C. or higher as an aqueous 1 wt. % solution thereof.

12. The process in claim 1, wherein the water content is 74 to 82% by weight.

13. The process in claim 4, wherein the water content is 74 to 82% by weight.

* * * * *